US006363267B1

(12) United States Patent
Lindskog et al.

(10) Patent No.: US 6,363,267 B1
(45) Date of Patent: Mar. 26, 2002

(54) MOBILE TERMINAL DECODE FAILURE PROCEDURE IN A WIRELESS LOCAL AREA NETWORK

(75) Inventors: Jan Lindskog, Pixbo; Gunnar Rydnell, Rävlanda; Lorens Almehag, Enskede; Göran Malmgren, Hägersten, all of (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 09/287,112

(22) Filed: Apr. 7, 1999

(51) Int. Cl.[7] ................................................ H04M 1/00
(52) U.S. Cl. ...................... 455/574; 455/515; 455/343; 340/7.32; 370/311
(58) Field of Search ............................... 455/38.3, 574, 455/515, 343; 340/7.38, 7.32; 370/311, 328, 449, 522, 524

(56) References Cited

U.S. PATENT DOCUMENTS

| 5,440,560 | A | * | 8/1995 | Rypinski | 370/457 |
| 5,826,173 | A | * | 10/1998 | Dent | 455/7.38 |
| 6,157,816 | A | * | 12/2000 | Anderson et al. | 340/7.32 |
| 6,223,047 | B1 | * | 4/2001 | Ericsson | 455/517 |

FOREIGN PATENT DOCUMENTS

EP     0 615 364 A1    9/1994

OTHER PUBLICATIONS

European Search Report dated Dec. 16, 1999.

* cited by examiner

Primary Examiner—Dwayne Bost
Assistant Examiner—Temica M. Davis
(74) Attorney, Agent, or Firm—Burns, Doane, Swecker & Mathis, L.L.P.

(57) ABSTRACT

In accordance with embodiments of the invention, in a Wireless Local Area Network (WLAN) configured in accordance with the HIPERLAN Type 2 standard where an Access Point (AP) and Mobile Terminals (MTs) use a duplex airlink having a MAC frame structure to communicate with each other, when an MT fails to properly perceive and decode a wakeup announcement in the MAC frame that is directed to it by the AP, the MT will remain awake and continue to decode and monitor subsequent MAC frames until it either receives a wakeup announcement directed to it, or until a predetermined number of MAC frames transpire. Where the MT fails to correctly decode a wakeup announcement and/or fails to send an acknowledgment signal back to the AP when the wakeup announcement includes a polling request, the AP will continue to resend the wakeup announcement and any appropriate, associated downlink data pending for the AP, in subsequent MAC frames. The AP continues until either the MT correctly receives the wakeup announcement and responds appropriately, or until a predetermined number of MAC frames expire.

9 Claims, 6 Drawing Sheets

1) MT SLEEP TIME EXPIRES AND MT EXAMINES BCCH FOR THE OCCURRENCE OF PENDING DATA INDICATOR

2) MT ANALYSIS FCCH FOR A PREDEFINED PDU ANNOUNCING THE LOCATION OF THE SBCH IN THE FRAME. (CURRENTLY DEFINED AS MAC-ID=0; DLCC-ID=0)

3) THE MT ANALYSIS THE SBCH PDU's IF THE ID OF THE MT IS INCLUDED IN A WAKE-UP ANNOUNCEMENT PDU.

4a) IF THE MT HAS PENDING DL DATA IN THE AP, I.E. A PDU WITH ITS ID EXISTS, THE MT WILL STAY ACTIVE IN ORDER TO RECEIVE DATA.

4b) IF NO PENDING DATA EXISTS, I.E. THE ID OF THE MT NOT INCLUDED, THE MT WILL ENTER SLEEP MODE AUTOMATICALLY WITHOUT ANNOUNCING THE AP.

FIG. 5

1) MT SLEEP TIME EXPIRES AND MT EXAMINES BCCH FOR THE OCCURRENCE OF PENDING DATA INDICATOR.

2) MT ANALYSIS FCCH IF THE ID OF THE MT IS INCLUDED IN A WAKE-UP ANNOUNCEMENT PDU.

3a) IF THE MT HAS PENDING DL DATA IN THE AP, I.E. A PDU WITH ITS ID EXISTS, THE MT WILL STAY ACTIVE IN ORDER TO RECEIVE DATA.

3b) IF NO PENDING DATA EXISTS, I.E. THE ID OF THE MT NOT INCLUDED, THE MT WILL ENTER SLEEP MODE AUTOMATICALLY WITHOUT ANNOUNCING THE AP.

MOBILE TERMINAL DECODE FAILURE PROCEDURE IN A WIRELESS LOCAL AREA NETWORK

FIELD OF THE INVENTION

The present invention relates generally to the field of wireless Local Area Network (LAN) communications, and in particular to establishment and coordination of mobile terminal sleep phases within the LAN.

BACKGROUND OF THE INVENTION

A new forthcoming standard for wireless LAN services having high throughput, ETSI HIPERLAN Type 2, promises to open new opportunities for both existing applications and new applications. Current versions and approved portions of the proposed ETSI HIPERLAN Type 2 standard are hereby incorporated by reference. HIPERLAN Type 2 LAN networks use a Time Division Duplex (TDD) airlink, meaning that an Access Point (AP) and a Mobile Terminal (MT) in the LAN network both use the same radio frequency to communicate with each other. The AP is connected to a Network (NW) such as an operator's intranet, and the MT will in most cases be a wireless Network Interface Card (NIC) to a personal computer (PC).

Figure 1:
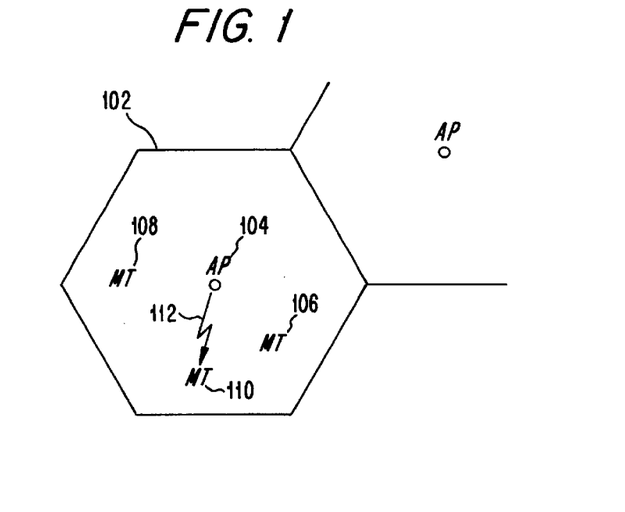
FIG. 1 shows an exemplary cell structure in accordance with the HIPERLAN Type 2 standard.

FIG. 1 shows an example configuration for an exemplary HIPERLAN Type 2 system, including an AP 104 within a cell 102. MTs 106, 108 and 110 are also located within the cell 102. As shown in FIG. 1, the AP 104 can communicate via a wireless TDD airlink 112 with, for example, the MT 110. Within each cell, an AP for that cell selects the best frequency with which to communicate with one or more MTs within the cell. The AP's frequency selection can be based on, for example, the AP's measurements of interference at other frequencies, as well on measurements made by MTs within the cell.

Figure 2:
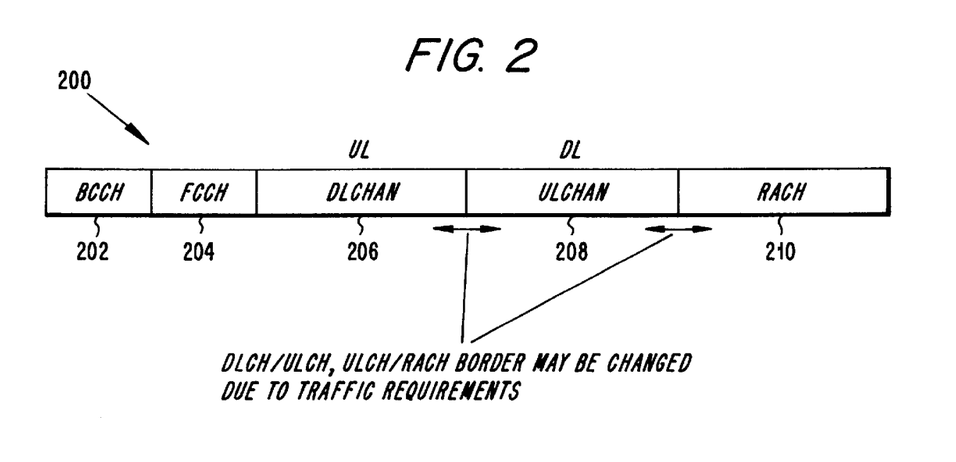
FIG. 2 shows an exemplary MAC frame in accordance with the HIPERLAN Type 2 standard.

In accordance with the proposed HIPERLAN Type 2 wireless LAN standard, a wireless LAN system includes a Medium Access Control (MAC) layer, which is implemented as a reservation-based MAC layer. FIG. 2 shows an exemplary MAC data frame 200 having an exemplary MAC frame structure, including a Broadcast Control Channel (BCCH) 202, a Frame Control Channel (FCCH) 204, a Downlink Channel (DLCHAN) 206, an Uplink Channel (ULCHAN) 208, and a Random Access Channel (RACH) 210. As shown in FIG. 2, the boundary between the DLCHAN 206 and the ULCHAN 208, as well as the boundary between the ULCHAN 208 and the RACH 210, can be changed in accordance with traffic requirements. Assuming that the MT 110 has been authenticated and a connection has been established between the MT 110 and the AP 104, then in order to send Uplink (UL) data via the AP 104, the MT 110 monitors the BCCH 202 and the FCCH 204 for the occurrence of random access opportunities. The MT 110 can then request uplink resources via the RACH 210, and the AP 104 will acknowledge the request for uplink resources and start scheduling UL resources in the TDD airlink 112 for use by the MT 110. In other words, when the MT 110 places a request for uplink resources, a reservation-based access starts.

When the AP 104 receives Downlink (DL) data from the network (NW) for the MT 110, the AP 104 either buffers the data and defers transmission of the data to the MT 110 if the MT 110 is sleeping, or transmits the DL data to the MT 110 at the next possible occasion. The AP 104 announces that it has data for the MT 110 (and/or other MT's within the cell 102) by broadcasting a frame having the format of the frame 200, with a MAC-ID and a Data Link Control Channel ID (DLCC-ID) of the MT 110 in the FCCH 204 following the BCCH 202. In this situation, the FCCH 204 also contains the exact location of the data for the MT 110, in the DLCHAN 206 of the frame 200. An MT having a MAC-ID can have several DLCC-IDs.

Figure 3:
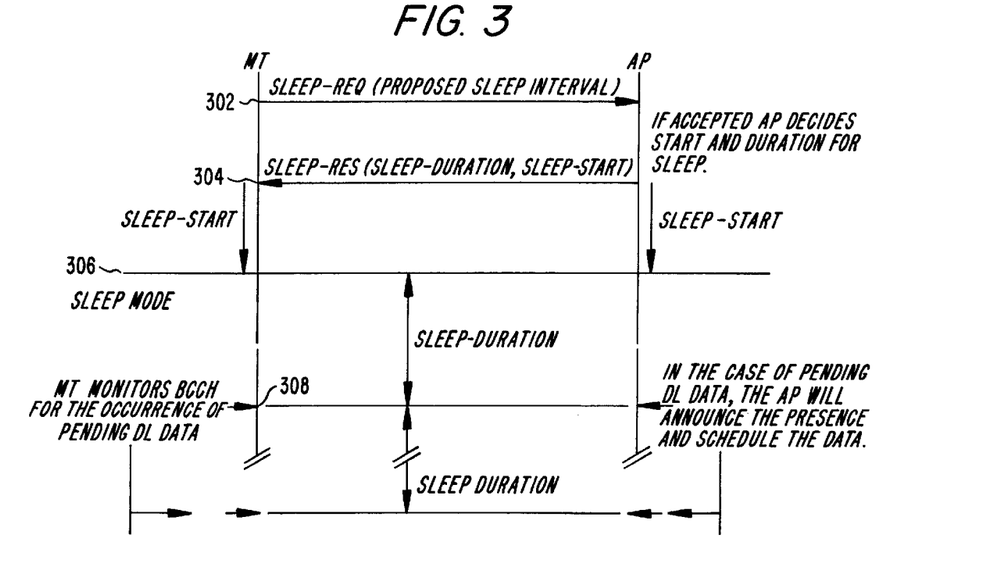
FIG. 3 shows an exemplary sleep negotiation dialog between an MT and an AP in accordance with the HIPERLAN Type 2 standard.

Since MTs are often powered by finite sources such as batteries, the HIPERLAN Type 2 standard provides for a sleep mode for the MTs to conserve energy usage by the MTs. This sleep mode is outlined in FIG. 3. As shown in FIG. 3, at a first step 302, an MT sends a sleep request signal, which can include a suggestion by the MT as to how long the sleep interval should be, or in other words, the sleep duration, to an AP. The AP accepts the sleep request signal, decides the starting time and the sleep duration, and then in step 304 sends a sleep reservation signal to the MT indicating the starting time at which the MT should enter the sleep mode, and the sleep duration or time the MT should remain asleep before "waking" to monitor the BCCH of a MAC frame from AP for the occurrence of DL data pending for the MT. The sleep duration can be, for example, an arbitrary number of MAC frames. At step 306 the MT enters the sleep mode, and then when the sleep duration expires at step 308, the MT awakens and monitors the BCCH for indications of DL data pending for the MT. If DL data is pending, the AP will notify the MT via the BCCH and schedule downloading of the DL data to the MT.

In particular, if the MT discerns that the BCCH contains a signal such as a pending data indicator, indicating that downlink data is pending at the AP for an as-yet undetermined MT, then the MT will analyze the content of a Slow Broadcast Channel (SBCH) in the MAC frame for a dedicated wakeup PDU directed to the MT. The SBCH location in the MAC frame is given by an Information Element (IE) in the FCCH. In other words, the MT will check further to determine whether it is the MT (or one of the MTs) for which data is pending. If no downlink data is pending for any MT, then the MT returns to the sleep mode for another sleep duration time period, at the end of which it will awaken and repeat the cycle by monitoring the BCCH for a pending data indicator, etc. If no pending data indicator is present, or if the indicator indicates that no downlink data is pending, then the MT will go back to sleep.

Figure 4:
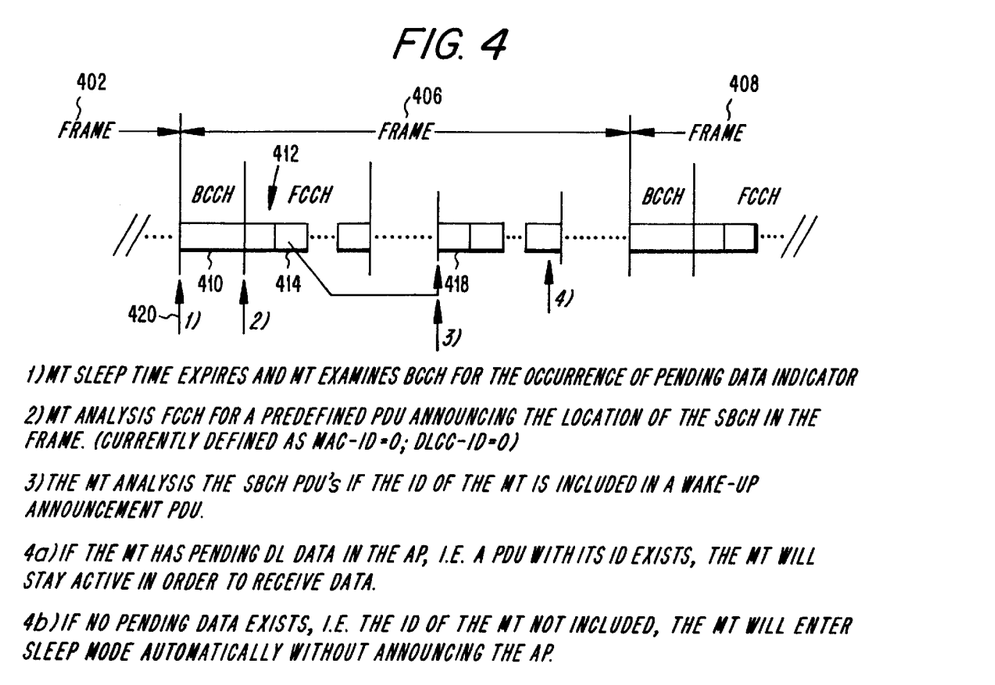
FIG. 4 shows an exemplary MAC frame that can contain wakeup PDUs located in an SBCH of the MAC frame.

FIG. 4 shows the case where an MT analyzes the SBCH in the MAC frame for a dedicated wakeup PDU. As shown in FIG. 4, when an MT sleep time expires at time 420, the MT first examines the BCCH 410 to determine whether the BCCH 410 contains a pending data indicator indicating that the MAC frame 406 contains data for an MT. The pending data indicator does not indicate which MT that the data, if present, is intended for. If a pending data indicator in the BCCH 410 does indicate that the MAC frame 406 contains data for an as yet unspecified MT, then the MT seeks to determine whether the MAC frame 406 contains data for it. It does so by analyzing the FCCH 412 for an indication as to where the SBCH 418 begins in the MAC frame. For example, the FCCH 412 can contain a predefined Information Element (IE) 414 that indicates where the SBCH 418 begins. For example, the predefined IE 414 can be defined to include a MAC-Identification (MAC-ID)=0 and a Downlink Control Channel Identification (DLCC-ID)=0.

The SBCH is located in the DLCHAN of the MAC frame 406. A DLCHAN can contain, or host, several logical channels, including the SBCH. These channels can include, for example, a User Data Channel (UDC), a DLC Control Channel (DLCH), where DLC stands for "Data Link Control", a Dedicated Control Channel (DCCH), an In-Band Channel (IBCH), and the Slow Broadcast Channel (SBCH) mentioned above.

The MT then analyzes the SBCH 418 to determine if the SBCH 418 contains any wake-up PDUs that include the MT's MAC-ID. If yes, then the MT knows that downlink data is pending for it, and the MT will stay active to receive the downlink data. If no, then the MT knows that no downlink data is pending for it, and it returns to the sleep mode automatically without announcement to the AP.

In a case where the MT has pending uplink data for transfer to the AP, then the MT can cut short its sleep duration timer or time period and request uplink resources from the AP by, for example, sending an uplink resource request signal on the RACH 210 of a MAC frame 200.

In Mobitex and pACT (Personal Air Communications System) systems, mobiles must know the concept of different sleep phases, which is not the case for HIPERLAN Type 2.

However, the methods described above suffer several drawbacks. For example, when the MT fails to properly decode the BCCH, FCCH and SBCH upon scheduled wakeup, the behavior of the MT and the AP is unknown. If the MT is presumed to go back to sleep when it fails to decode the BCCH, FCCH or SBCH, then the AP cannot discern whether the MT successfully decoded the wakeup information (for example a wakeup announcement) sent from the AP to wakeup the MT, or whether the AP failed to properly decode or perceive an acknowledgment from the MT (in situations where, for example, the wakeup information instructs the MT to send an acknowledgment signal such as a predetermined signal back to the AP on a reserved uplink channel in the MAC frame that is identified in the wakeup information, or via the next available RACH). The wakeup information can be, for example, in a first case, a wakeup Information Element (IE) located in the FCCH, or in a second case, a wakeup Packet Data Unit (PDU) located in the SBCH.

The AP also cannot discern a situation where the MT failed to properly decode the BCCH, FCCH, or SBCH. In other words, the AP cannot definitively discern the status of the MT. Furthermore, since in the situation where the MT fails to properly decode the BCCH, FCCH or SBCH, the MT is presumed to go back to sleep, the AP must wait until the MT again wakes up before again attempting to establish communication with the MT.

In particular, if the AP sent a wakeup announcement to an MT and the MT failed to properly decode the BCCH, FCCH or SBCH and thus missed a wakeup IE or PDU intended for the MT, (where a MAC-ID in the wakeup IE or PDU that matches the MAC-ID of the MT indicates that the wakeup IE or PDU is intended for the MT), the AP may presume that the MT successfully received the wakeup announcement and is prepared to receive downlink data. Then, the AP will start transmitting downlink data that is pending for the MT. If the MT is not active but instead went back to sleep after missing the wakeup announcement, the retransmission timers in the AP may time out before the MT again awakens to check for pending downlink data, which can cause the AP to remove the MT from a list of MTs that it knows are present in its cell.

Furthermore, if an MT is required to send a new sleep request signal to the AP upon a failure to decode the BCCH, FCCH, or SBCH, the sleep request signal can collide with other data traffic in the MAC frame and lead to unpredicted delays and cumbersome situations for the AP to untangle and resolve. If transmission for all of the MTs to whom a wakeup announcement was transmitted is deferred until the AP can determine that all MTs intending to transmit sleep request signals have done so, then data transmission between the AP and one or more of the MTs can be undesirably delayed.

SUMMARY OF THE INVENTION

In accordance with an exemplary embodiment of the invention, where a type of a wakeup announcement to an MT can indicate whether the MT is required to acknowledge the wakeup announcement, when the MT fails to decode a BCCH, FCCH or SBCH that may contain a wakeup announcement for the MT, the MT decodes subsequent MAC frames to look for the presence of a new wakeup announcement for the MT from the AP.

In accordance with another embodiment of the invention, depending on an amount of traffic present and on algorithms implemented in a scheduler and a sleep announcement entity in the AP, a second wakeup announcement directed to an MT can be included in a next MAC frame following a MAC frame that contained a first wakeup announcement for the MT. As traffic increases, a probability that the second wakeup announcement will be included in a MAC frame subsequent to the next MAC frame following the MAC frame that contained the first wakeup announcement, also increases.

In accordance with another embodiment of the invention, after unsuccessfully decoding a BCCH, FCCH or SBCH that may contain a wakeup announcement for the MT, the MT shall continue to monitor subsequent MAC frames for the occurrence of a wakeup announcement for the MT, until either a predetermined number ($N_{frames}$) of MAC frames have transpired, or the MT successfully receives a wakeup announcement. When the MT successfully receives a wakeup announcement, it will remain awake.

In accordance with another embodiment of the invention, when the AP sends a wakeup announcement to an MT indicating that downlink data is pending for the MT, the AP shall proceed as if the MT were active, or in other words, awake. Depending on whether the AP is polling the MT prior to sending data (by, for example, sending a wakeup announcement indicating that the MT should send an acknowledge signal back to the MT), the AP shall retransmit the polling request a configurable number of times, for example until a predetermined number of MAC frames have transpired.

If no polling is used, then the AP shall continue to transmit or retransmit data a configurable number of times until, for example, a predetermined number ($N_{frames}$) of MAC frames have transpired. The configurable number can be based on or limited by a maximum allowed number of retransmissions.

In accordance with embodiments of the invention, these features can also variously combined.

BRIEF DESCRIPTION OF THE DRAWINGS

Other objects and advantages of the invention will become apparent to those skilled in the art from the following detailed description of preferred embodiments, when read in conjunction with the accompanying drawings. Like elements in the drawings have been designated by like reference numerals.

DETAILED DESCRIPTION OF THE INVENTION

Various embodiments of the invention can also be used in situations where the wakeup information includes wakeup IEs that are located in the FCCH, rather than wakeup PDUs that are located in the SBCH. In particular, if the MT discerns that the BCCH contains an indication that DL data is pending at the AP for the MT, then the MT will analyze the content of the FCCH in the MAC frame for an Information Element (IE) or wakeup PDU indicating downlink data is scheduled or pending for the MT.

Figure 5:
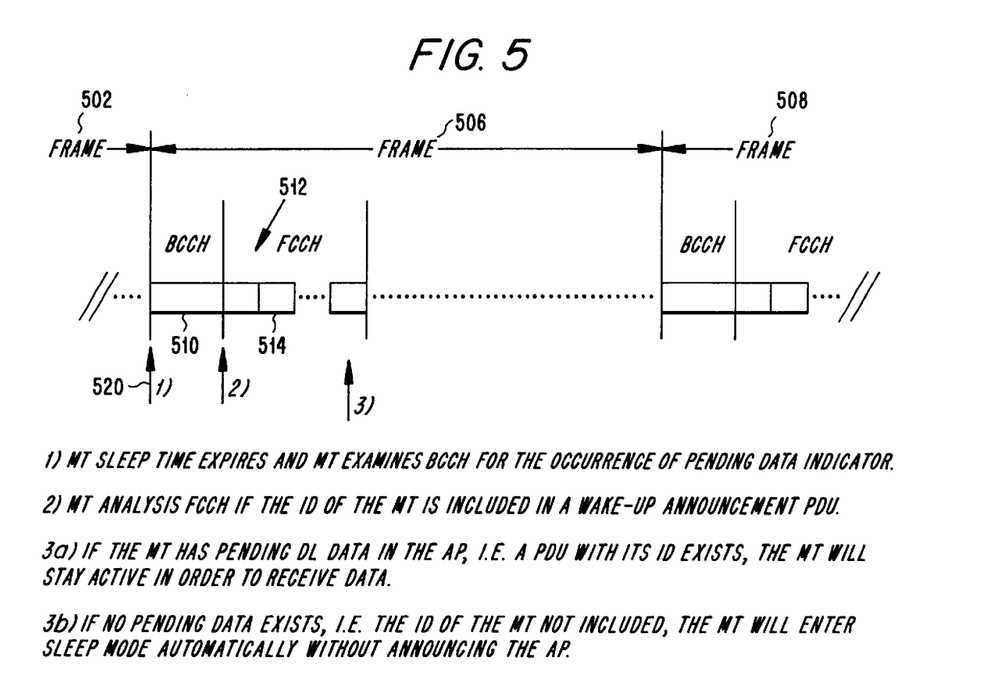
FIG. 5 shows an exemplary MAC frame in accordance with an exemplary embodiment of the invention.

FIG. 5 shows the case where an MT analyzes the content of the FCCH in the MAC frame for an Information Element (IE) having the MAC-ID of the MT, thus indicating that downlink data is pending for the MT. As shown in FIG. 5, when an MT sleep time expires at time 520, the MT first examines the BCCH 510 to determine whether the BCCH 510 contains a pending data indicator such as that described with respect to FIG. 4, indicating that the MAC frame 506 contains data for an MT. If a pending data indicator in the BCCH 510 does indicate that the MAC frame 506 contains data for an as yet unspecified MT, then the MT seeks to determine whether the MAC frame 506 contains data for it. It does so by analyzing the FCCH 512 to determine if the FCCH 512 contains a wake-up announcement IE, such as the wakeup IE 514, that includes the MAC-ID of the MT. If yes, then the MT knows that there is pending downlink data for it, and it will stay active (or in other words, awake) in order to receive the pending downlink data. If no, then the MT knows that there is no pending downlink data for it, and it will re-enter the sleep mode automatically without announcement to the AP.

Since the FCCH will always be present in the MAC frame when data is scheduled in the frame, there is no extra cost incurred when the AP divides sleeping MTs into different groups. For example, to awaken one sleeping MT, one IE in the FCCH bearing the MAC-ID of the MT is necessary, and if two sleeping MTs are to be awakened, then two IEs are required in the FCCH, and so forth. Thus, overhead such as that associated with a preamble of an SBCH is avoided.

Furthermore, the IE or wakeup PDU for a particular sleeping MT can simply be the same IE that would be used to signal the MT if it were awake, or in other words active, since the IE for an active MT will contain both the MAC-ID for the MT and will indicate which downlink channel in the MAC frame the MT can find the downlink data that is scheduled for it to receive.

The IE or wakeup PDU can also be of a type that indicates to the MT that the MT should send a predetermined acknowledge signal back to the AP in an allocated uplink channel within the MAC frame, where the IE identifies the allocated uplink channel that the AP has set aside for the MT. Thus, the IE can be used as a polling request from the AP to the MT. Alternatively, the IE can instruct the MT to send the predetermined acknowledge signal back to the AP via the RACH in the same MAC frame, or in a subsequent MAC frame when the RACH first becomes available. Since the FCCH is located earlier in the MAC frame than the SBCH, locating the IE in the FCCH instead of the SBCH provides the MT with more time to awaken and prepare and send the predetermined acknowledge signal.

The IE or wakeup PDU can also include a null pointer, or in other words a pointer in the IE that is set to a null value, where the null value indicates to the MT that the MAC frame does not contain downlink data for the MT, and the MT should simply remain awake until further notice and decode each BCCH and FCCH that comes along, in order to receive downlink data that will be provided to it in the future. For example, this can provide a scheduler in the AP with a graceful way to handle a new MT in the same MAC frame that the MT wakes up in.

In accordance with a first exemplary embodiment of the invention, where a type of a wakeup announcement to an MT can indicate whether the MT is required to acknowledge the wakeup announcment, when the MT fails to decode a BCCH, FCCH or SBCH that may contain a wakeup announcement for the MT, the MT decodes subsequent MAC frames to look for the presence of a new wakeup announcement for the MT from the AP.

In accordance with a second exemplary embodiment of the invention, depending on an amount of traffic present and on algorithms implemented in a scheduler and a sleep announcement entity in the AP, a second wakeup announcement directed to an MT can be included in a next MAC frame following a MAC frame that contained a first wakeup announcement for the MT. As traffic increases, a probability that the second wakeup announcement will be included in a MAC frame subsequent to the next MAC frame following the MAC frame that contained the first wakeup announcement, also increases.

In accordance with a third exemplary embodiment of the invention, after unsuccessfully decoding a BCCH, FCCH or SBCH that may contain a wakeup announcement for the MT, the MT shall continue to monitor subsequent MAC frames for the occurrence of a wakeup announcement for the MT, until either a predetermined number ($N_{frames}$) of MAC frames have transpired, or the MT successfully receives a wakeup announcement. When the MT successfully receives a wakeup announcement, it will remain awake.

In accordance with a fourth exemplary embodiment of the invention, when the AP sends a wakeup announcement to an MT indicating that downlink data is pending for the MT, the AP shall proceed as if the MT were active, or in other words, awake. Depending on whether the AP is polling the MT prior to sending data (by, for example, sending a wakeup announcement indicating that the MT should send an acknowledge signal back to the MT), the AP shall retransmit the polling request a configurable number of times, for example until a predetermined number of MAC frames have transpired.

If no polling is used, then the AP shall continue to transmit or retransmit data a configurable number of times until, for example, a predetermined number ($N_{frames}$) of MAC frames have transpired. The configurable number can be based on or limited by a maximum allowed number of retransmissions.

Figure 6:
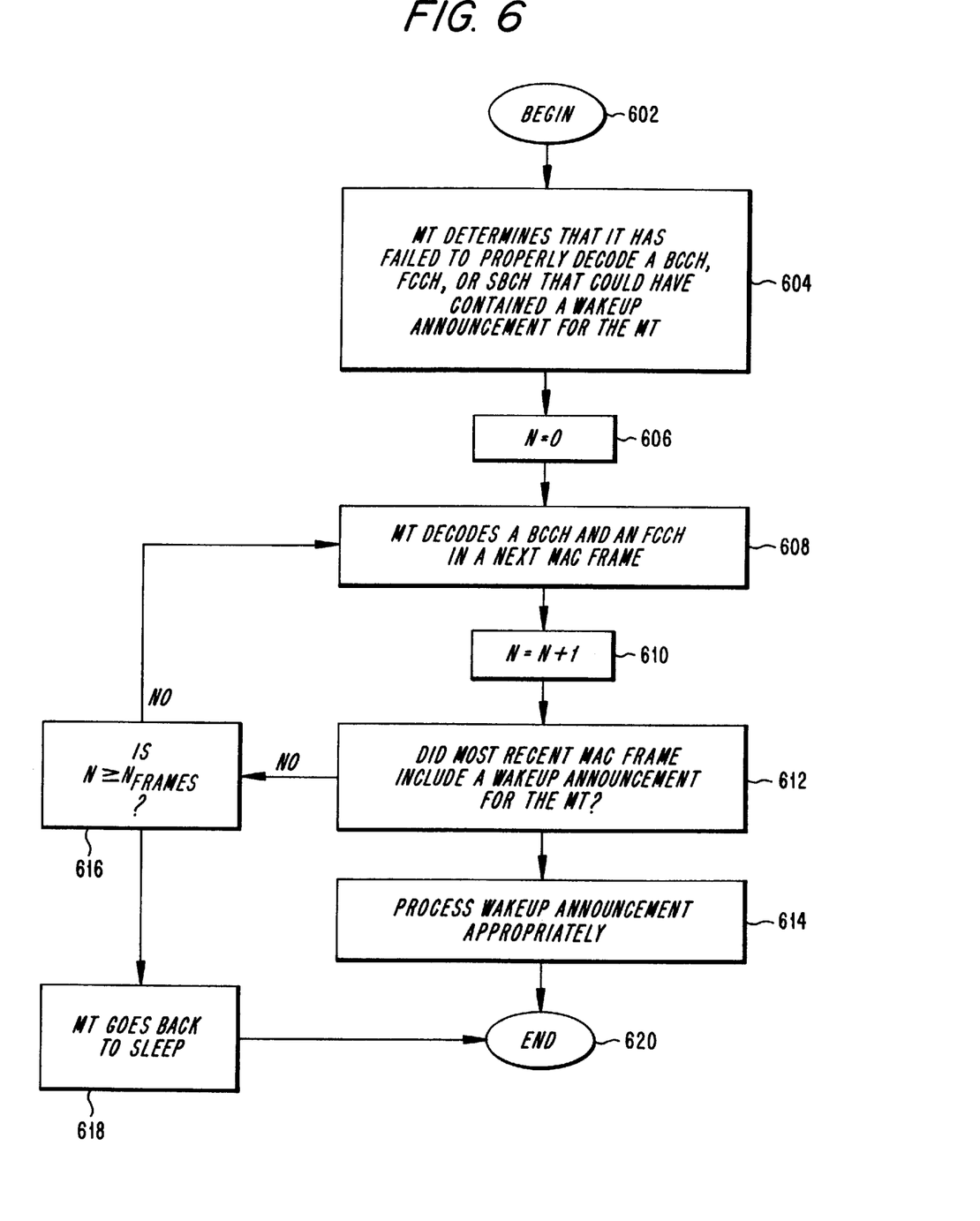
FIG. 6 shows a flow chart of a process in accordance with exemplary embodiments of the invention.

FIG. 6 generally illustrates the principles described above for exemplary embodiments of the invention, from the perspective of an MT. As shown in FIG. 6, after beginning at step 602, control proceeds to step 604 where an MT that has awakened to monitor a MAC frame, determines that it has failed to properly decode a BCCH, FCCH or SBCH in the MAC frame that could have contained a wakeup announcement for the MT. From step 604 control proceeds to step 606, where a counter N is set to zero. From step 606, control proceeds to step 608 where the MT decodes a BCCH and an FCCH in a next MAC frame. From step 608, control proceeds to step 610, where the counter N is incremented, and from step 610 control proceeds to step 612. In step 612, the MT determines whether the most recent MAC frame contained a wakeup announcement directed to it. If yes, then control proceeds from step 612 to step 614, where the MT processes the wakeup announcement appropriately, and then control proceeds from step 614 to step 620 where the process ends. If at step 612 the MT determines that the most recent MAC frame did not include a wakeup announcement for the MT, then control flows from step 612 to step 616, where N is compared with a predetermined value $N_{frames}$. If N is greater than or equal to the predetermined value $N_{frames}$, then control proceeds to step 618, where the MT goes back to sleep. From step 618 control proceeds to step 620. If at step 616 N is found to be less than the predetermined value $N_{frames}$, then control returns to step 608 and the cycle repeats.

Figure 7:
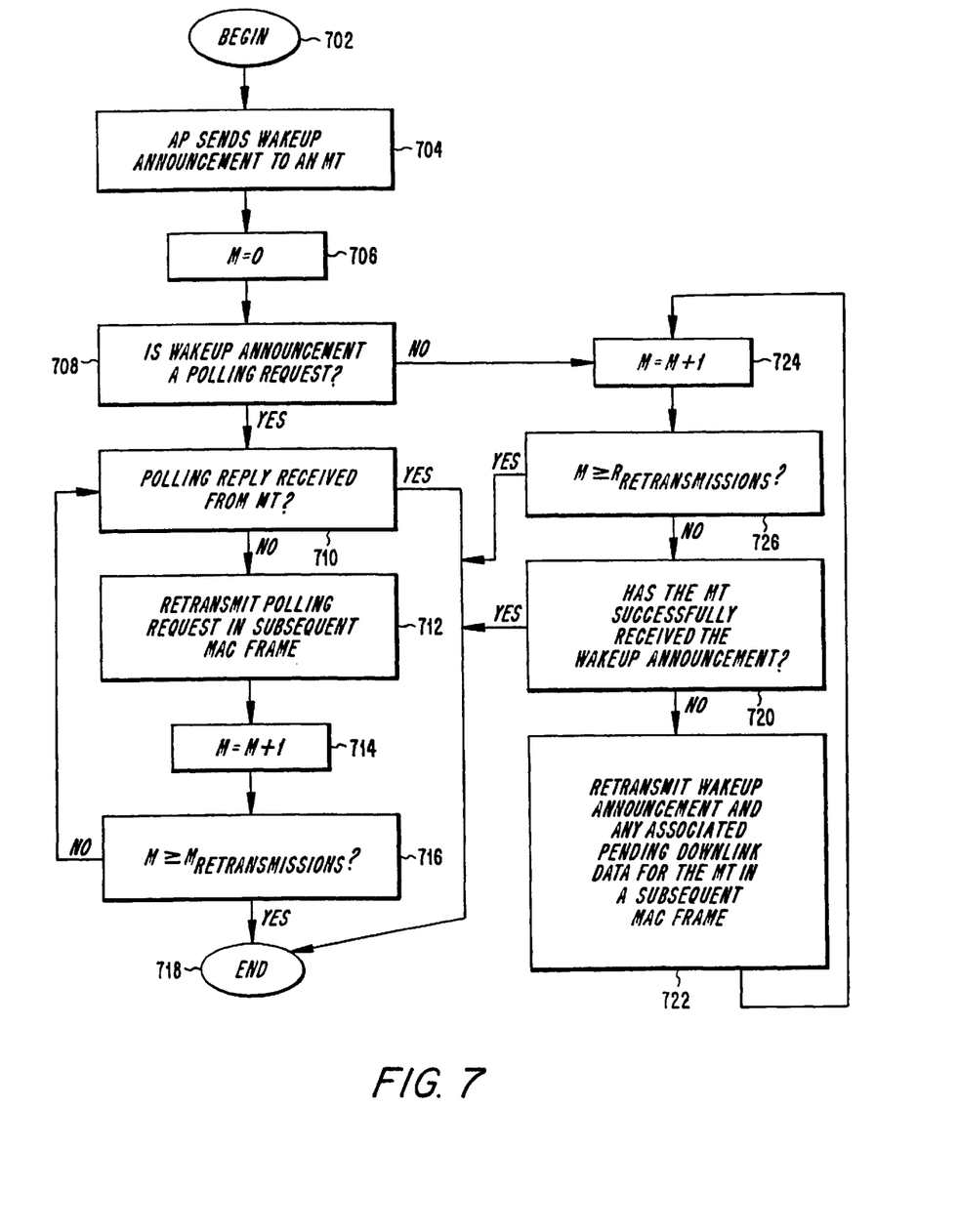
FIG. 7 shows a flow chart of a process in accordance with exemplary embodiments of the invention.

FIG. 7 generally illustrates the principles described above for exemplary embodiments of the invention, from the perspective of an AP. As shown in FIG. 7, the process begins at step 702, and then proceeds to step 704 where the AP sends a wakeup announcement to an MT in a MAC frame. From step 704 control proceeds to step 706, where a counter M is set to zero. From step 706 control proceeds to step 708, where it is determined whether the wakeup announcement was a polling request to the MT. If yes, then control flows to step 710, where the AP determines whether it has received a polling acknowledgment signal from the MT. If yes, then control proceeds from step 710 to step 718, and the process ends. If no, then control proceeds from step 710 to step 712, where the AP retransmits the polling request to the MT in a subsequent MAC frame at a next available opportunity. From step 712, control proceeds to step 714 where the counter M is incremented. From step 714, control proceeds to step 716, where M is compared with a predetermined value $M_{retransmissions}$. If M is greater than or equal to the predetermined value $M_{retransmissions}$, then control proceeds from step 716 to step 718 and the process ends. If M is less than the predetermined value $M_{retransmission}$, then control returns from step 716 to step 710.

If in step 708 it is determined that the wakeup announcement was not a polling request, then control proceeds from step 708 to step 724 where the value of M is incremented. From step 724, control proceeds step 726, where the value of M is compared with a predetermined value $R_{retransmssions}$. If the value of M is greater than or equal to the predetermined value $R_{retransmissions}$, then control proceeds from step 726 to step 718 and the process ends. If the value of M is less than the predetermined value $R_{retransmissions}$, then control proceeds from step 726 to step 720, where the AP determines whether the MT has successfully received the wakeup announcement. The AP can generally determine whether the MT has successfully received the wakeup announcement, for example, using Automatic Repeat Request (ARQ) principles well known in the art. When the MAC layer operates in an unacknowledged mode, or when data is time sensitive and obsolete if not received when originally sent, the predetermined value $R_{retransmissions}$ can be set equal to 1 (one). If in step 720 the AP determines that the MT has successfully received the wakeup announcement, then control proceeds from step 720 to step 718, and the process ends. If the MT did not successfully receive the wakeup announcement, then control proceeds from step 720 to step 722, where the AP retransmits the wakeup announcement and any associated pending downlink data for the MT in a subsequent MAC frame at a next available opportunity. From step 722, control proceeds to step 718, and the process ends.

Figure 8:
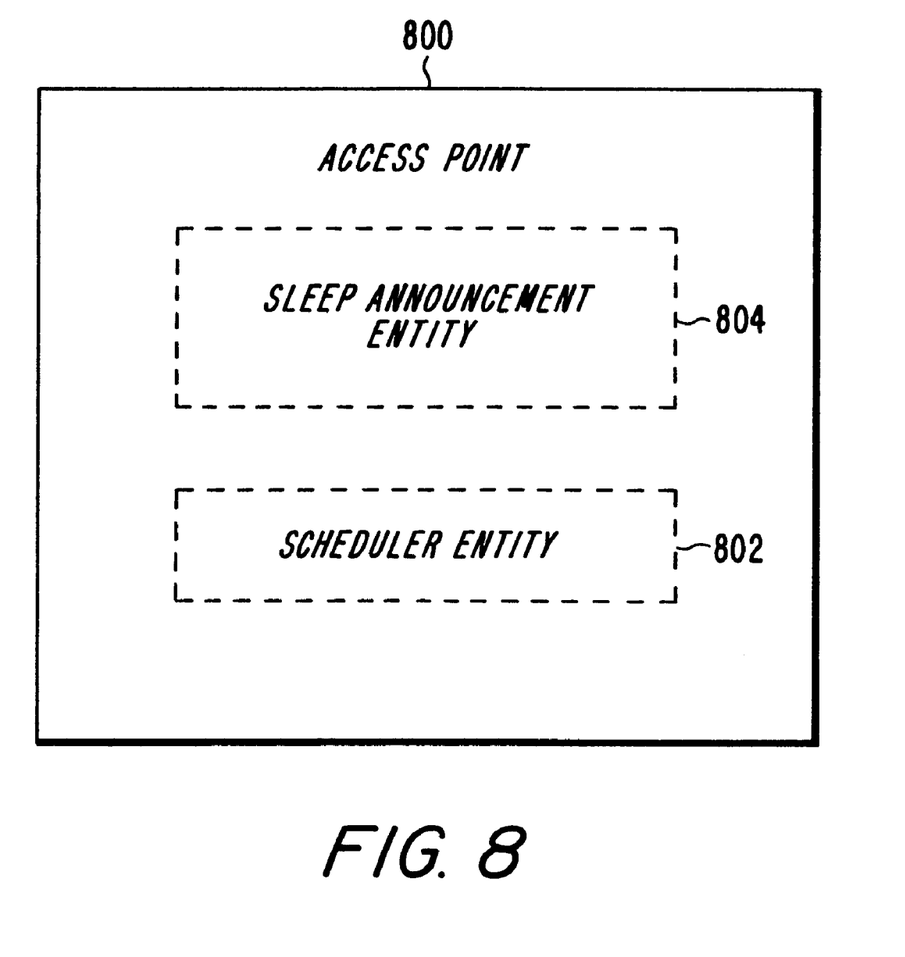
FIG. 8 shows internal details of an exemplary AP in accordance with exemplary embodiments of the invention.

FIG. 8 shows internal details of an exemplary AP in accordance with exemplary embodiments of the invention. In particular, an AP 800 can include a scheduler entity 802 and a sleep announcement entity 804.

Those skilled in the art will appreciate that the features described above can be variously combined.

Copending and commonly owned application, entitled "Mobile Terminal Sleep Phase Assignment and Announcement in a Wireless Local Area Network" and identified with Attorney Docket No. 040000-528 and filed on the same day as the present application, is hereby incorporated by reference.

Those skilled in the art will recognize that the features and embodiments described in the copending and commonly owned application referenced above can be advantageously combined with the features and embodiments described in the present application.

Ericsson documents no. ERVS-99013, ERVS-99021 and ERVS-99022 are hereby incorporated by reference, and are also filed herewith as Appendices A, B, and C, respectively.

An approved portion of the proposed ETSI HIPERLAN Type 2 standard that was published on Apr. 7, 1999, is incorporated herein by reference, and is also filed herewith as Appendix D.

It will be appreciated by those skilled in the art that the present invention can be embodied in other specific forms without departing from the spirit or essential characteristics thereof, and that the invention is not limited to the specific embodiments described herein. The presently disclosed embodiments are therefore considered in all respects to be illustrative and not restrictive. The scope of the invention is indicated by the appended claims rather than the foregoing description, and all changes that come within the meaning and range and equivalents thereof are intended to be embraced therein.

What is claimed is:

1. A method for implementing a mobile terminal decode failure procedure in a wireless local area network, comprising the steps of:

sending a sleep request from a mobile terminal in the network to an access point in the network, wherein the sleep request includes a proposed sleep interval;

receiving a sleep reservation in the mobile terminal from the access point, wherein the sleep reservation includes a sleep duration and a sleep start time for the mobile terminal;

the mobile terminal going to sleep at the sleep start time;

the mobile terminal listening, at the end of the sleep duration, for a wakeup announcement in a Medium Access Control (MAC) frame sent by an access point in the network;

determining in the mobile terminal, whether the mobile terminal has failed to properly decode a wakeup announcement in a Medium Access Control (MAC) frame sent by the access point in the network; and in the mobile terminal, in response to a determined decode failure, remaining awake to monitor subsequent MAC frames until either a predetermined number of MAC frames transpire, or a wakeup announcement intended to awaken the mobile terminal is properly decoded, whichever occurs first.

2. The method of claim 1, further comprising the steps of:

determining in an access point in the network, whether a mobile terminal in the network has failed to properly decode a wakeup announcement in a Medium Access Control (MAC) frame sent by an access point in the network; and retransmitting the wakeup announcement in subsequent MAC frames from the access point to the mobile terminal, prior to a next scheduled wakeup announcement broadcast period for the mobile terminal, until either a number of retransmissions reaches a predetermined threshold, or the mobile terminal successfully decodes one of the retransmitted wakeup announcements, whichever occurs first.

3. The method of claim 2, wherein when the wakeup announcement includes a polling request and the mobile terminal fails to respond to the polling request, determining that the mobile terminal has failed to properly decode the wakeup announcement.

4. The method of claim 1, wherein when the access point includes a null pointer in the wakeup announcement, the mobile terminal remains awake and decodes each Broadcast Control Channel (BCCH) and Frame Control Channel (FCCH) that comes along, until further notice.

5. The method of claim 4, wherein the access point minimizes bandwidth use by including the null pointer in the wakeup announcement.

6. The method of claim 4, wherein the access point sends at least two wakeup announcements to the mobile terminal, each of the at least two wakeup announcements including the null pointer.

7. The method of claim 1, wherein the predetermined number of MAC frames is greater than 1.

8. The method of claim 4, wherein the null indicator indicates that a) the MAC frame does not contain downlink data for the mobile terminal, and b) the mobile terminal should remain awake to await downlink data that will be provided in the future.

9. The method of claim 8, wherein the null indicator indicates that the mobile terminal should not send a reply signal to the access point.

* * * * *